W. H. SILVER.
Churn-Dasher.
No. 164,491. Patented June 15, 1875.
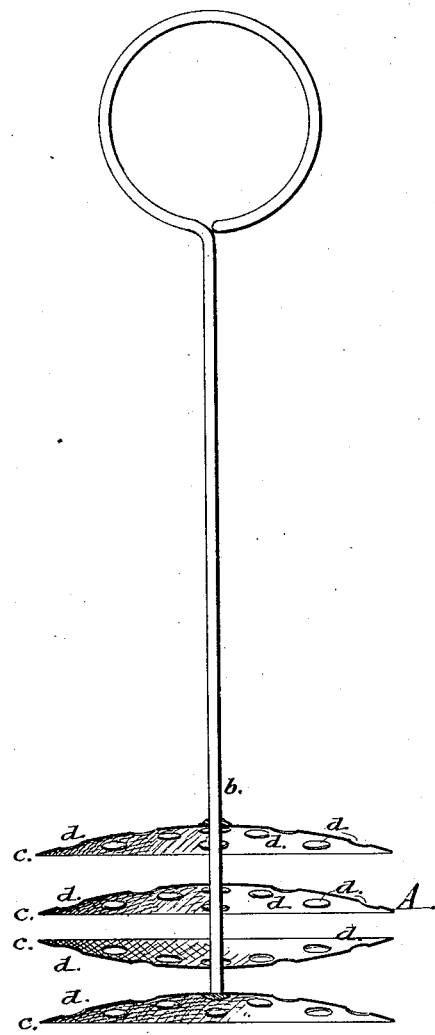
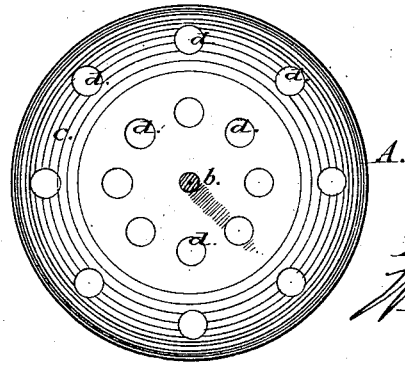
Witnesses:
Wm. E. Chaffee
Thos. Jewell
Inventor:
Wm. H. Silver

UNITED STATES PATENT OFFICE.

WILLIAM H. SILVER, OF ST. LOUIS, MISSOURI, ASSIGNOR TO ANN SILVER.

IMPROVEMENT IN CHURN-DASHERS.

Specification forming part of Letters Patent No. 164,491, dated June 15, 1875; application filed March 26, 1875.

*To all whom it may concern:*

Be it known that I, WILLIAM H. SILVER, of the city of St. Louis, St. Louis county, of State of Missouri, have invented certain new and useful Improvements in Churn-Dashers; and do declare that the following is a full and clear description thereof, reference being had to the accompanying drawings, and to the letters of reference marked thereon, making a part of this specification.

My invention has for its object to furnish an improved churn-dasher which shall be simple in its construction, light, strong, easily cleaned, and effective in its operation, bringing the butter quickly and thoroughly.

The invention consists of an improved churn-dasher, composed of the dasher-rod and the four perforated dashers, which are made concavo-convex, said parts being constructed and arranged in connection with each other, as hereinafter fully described.

Referring to the annexed drawings, in which Fig. 1 is a horizontal section of my improved dasher, and Fig. 2 is a vertical section of the same, A denotes the dasher, which is composed of the dasher-rod $b$, and the four perforated concavo-convex disks $c$. In the dashers $c$ are formed numerous small holes $d$ of form and number that may be desired. The dashers may be made of tin or any material desirable. The disks and all are to be securely attached to the lower end of the dasher-rod $b$. The lower dasher is attached with its concavity facing downward, and may be strengthened by having a metal rod extended out from the dasher-rod $b$, and being soldered to it and the dasher proper. To allow of it and the disks being soldered to the rod, the lower end of the dasher-rod should be surrounded with tin or any suitable metal. The two center dashers are attached to the rod $b$, with their concavities facing. They are placed a little apart from each other and also from the lower and upper dashers. The outer edges of the two center dashers must be sufficiently separated as to allow of a perfect suction and draft to take place between them, and to give agitation to whatever is being worked when between these two dashers. The edges of these two dashers cut and subdivide the milk not a little, and it is necessary on this account that they should be separated, as, also, that the contents may be removed and the concavities cleaned when through working. The upper dasher is placed with its concavity facing downward, similar to the adjoining dasher, as also the lower dasher. By this arrangement air is perfectly introduced into the body of the milk with each plunge of the dasher-rod, and the suction is much better, as also the agitation, than if the dasher was attached to the rod with its concavity upward. The dashers should all be so arranged that the holes of each are out of coincidence of those adjoining.

When the dashers are thus constructed the milk is finely divided, and is thrown into numerous currents and counter-currents, bringing the butter in a very short time and developing all the butter there may be in the milk.

I am aware that churn-dashers have before been constructed of four perforated disks, the upper and lower having their concavities in opposite directions, while the concavities of the middle ones face each other with their outer edges in contact and soldered together; this, therefore, I do not claim; but What I do claim, and desire to secure by Letters Patent, is—

A churn-dasher, composed of the four independent and separate disks $c$, the upper and lower having their concavities facing in the same direction, while the concavities of the middle ones face each other, and the disks seaparated a short distance from each other, and all attached to a central solid rod, $b$, as and for the purposes described.

WM. H. SILVER.

Witnesses:
 THOMAS C. CONNOLLY,
 HENRY H. BURTON.